(12) United States Patent
Bambara

(10) Patent No.: US 9,308,470 B2
(45) Date of Patent: Apr. 12, 2016

(54) LIQUID-LIQUID EXTRACTOR

(71) Applicant: Charles J. Bambara, Short Hills, NJ (US)

(72) Inventor: Charles J. Bambara, Short Hills, NJ (US)

(73) Assignee: The Chem-Pro Group LLC, Boonton, NJ (US)

( * ) Notice: Subject to any disclaimer, the term of this patent is extended or adjusted under 35 U.S.C. 154(b) by 353 days.

(21) Appl. No.: 13/796,801

(22) Filed: Mar. 12, 2013

(65) Prior Publication Data

US 2014/0263051 A1     Sep. 18, 2014

(51) Int. Cl.
*B01D 11/04* (2006.01)
*B01D 11/00* (2006.01)

(52) U.S. Cl.
CPC ............ *B01D 11/0434* (2013.01); *B01D 11/00* (2013.01); *B01D 11/04* (2013.01); *B01D 11/0426* (2013.01)

(58) Field of Classification Search
CPC .. B01D 11/04; B01D 11/0426; B01D 11/043; B01D 11/0434; B01D 11/0438; B01D 11/0453; B01D 11/0457; B01D 11/0476
USPC ........................................................ 422/256
See application file for complete search history.

(56) References Cited

U.S. PATENT DOCUMENTS

| | | | |
|---|---|---|---|
| 1,320,396 A | 11/1919 | Laird | |
| 2,000,606 A | 5/1935 | Othmer | |
| 2,011,186 A | 8/1935 | Van Dijck | |
| 2,029,690 A | 2/1936 | Wilson | |
| 2,062,535 A | * 12/1936 | Thompson | ...................... 99/361 |
| 2,261,101 A | 10/1941 | Erwin | |
| 2,391,110 A | * 12/1945 | Walker | .................. B01F 5/0682 366/131 |
| 2,601,674 A | 6/1952 | Reman | |
| 2,614,031 A | * 10/1952 | Tickler | .......................... 422/256 |
| 2,664,109 A | * 12/1953 | Iager | ............................... 138/42 |
| 2,667,407 A | 1/1954 | Fenske et al. | |
| 3,032,403 A | 5/1962 | Kohl | |
| 3,199,962 A | 8/1965 | Whitaker | |
| 3,351,434 A | 11/1967 | Grimes et al. | |
| 3,522,172 A | 7/1970 | Pretorius et al. | |
| 3,676,058 A | * 7/1972 | Gray | ............................... 422/21 |

(Continued)

FOREIGN PATENT DOCUMENTS

| CN | 101693150 B | 4/2011 |
|---|---|---|
| CN | 102655918 A | 9/2012 |

(Continued)

OTHER PUBLICATIONS

International Search Report and Written Opinion for Application No. PCT/US2014/022474 dated Jul. 10, 2014.

*Primary Examiner* — Katherine Zalasky
*Assistant Examiner* — Benjamin Lebron
(74) *Attorney, Agent, or Firm* — Lerner, David, Littenberg, Krumholz & Mentlik, LLP

(57) ABSTRACT

An apparatus is provided for extracting compounds from mixtures based on their relative solubilities in different solvents. The mixture can be introduced into a cylindrical container in which the mixture is agitated as it flows past a plurality of plates mounted along a shaft. At least one plate is arranged at a nonzero angle with respect to a plane normal to the shaft and features a plurality of perforations. Agitation by the plates breaks the mixture into small, evenly dispersed droplets and a solvent is introduced into the container to extract the desirable compound and thus separate it from the undesirable compounds.

22 Claims, 10 Drawing Sheets

(56) References Cited

U.S. PATENT DOCUMENTS

| | | | |
|---|---|---|---|
| 3,822,999 A * | 7/1974 | Pope | B01D 11/0434 196/14.52 |
| 4,011,026 A * | 3/1977 | Bennett | 408/199 |
| 4,017,389 A | 4/1977 | Heath et al. | |
| 4,057,224 A | 11/1977 | Muller et al. | |
| 4,111,660 A | 9/1978 | Kabasawa et al. | |
| 4,200,525 A | 4/1980 | Karr | |
| 4,251,231 A | 2/1981 | Baird | |
| 4,378,292 A | 3/1983 | Haase | |
| 4,541,724 A | 9/1985 | Cornelissen | |
| 4,567,020 A * | 1/1986 | Cognet | B01D 11/0457 202/169 |
| 4,588,563 A | 5/1986 | Fiocco | |
| 4,634,578 A | 1/1987 | Fiocco | |
| 4,729,830 A | 3/1988 | Suzuki | |
| 4,747,948 A * | 5/1988 | North | 422/259 |
| 4,748,006 A | 5/1988 | Fiocco | |
| 5,194,152 A | 3/1993 | Takacs et al. | |
| 5,219,533 A | 6/1993 | Larson | |
| 5,393,429 A | 2/1995 | Nakayama et al. | |
| 5,628,901 A | 5/1997 | Lawrence et al. | |
| 6,569,390 B1 | 5/2003 | Sullivan | |
| 6,818,033 B2 | 11/2004 | North | |
| 2006/0086664 A1 | 4/2006 | Wills | |
| 2006/0124544 A1 | 6/2006 | Wills | |
| 2007/0193960 A1 | 8/2007 | Frank et al. | |
| 2012/0080105 A1 | 4/2012 | Bambara | |

FOREIGN PATENT DOCUMENTS

| | | |
|---|---|---|
| EP | 0231615 A1 | 8/1987 |
| WO | 8601424 A1 | 3/1986 |

\* cited by examiner

LIQUID-LIQUID EXTRACTOR

BACKGROUND OF THE INVENTION

The present invention relates to an apparatus for liquid-liquid extraction, i.e. extraction of a liquid from a mixture of multiple liquids, and a method of using such an apparatus. More particularly, the invention relates to an apparatus for liquid-liquid extraction in which counterflowing liquid phases are brought into contact with each other in an extraction column having rotating plates, with at least one of the plates being arranged at a non-zero angle with respect to a plane normal to a shaft of the column.

In general, liquid-liquid extraction achieves the isolation of a desired liquid from the multiple liquids of an initial mixture by introducing an additional liquid not present in the initial mixture and not soluble in the initial mixture, to form an aggregate mixture. The additional liquid, often a solvent, is appropriately selected such that it preferentially adheres to the desired liquid in the initial mixture and such that it is insoluble with the initial mixture, so that the aggregate mixture stratifies into two distinct liquid phases or layers, such as oil and water, when it is not agitated. The aggregate mixture is then acted upon such that its components are separated, when the agitation is afterward removed, which results in the separation of the multiple liquids of the initial mixture, the desired one now joined with the solvent. Efficient extraction involves equipment that agitates and thereby maximizes the interaction between the two liquid layers of the aggregate mixture being separated.

Prior art liquid-liquid extraction apparatuses and processes have included different configurations of propagating and rotating plates. Stationary trays, sometimes in combination with pulsating and reversing flows have also been utilized to aid in the separation of the components of the liquid phases being passed through the apparatus in either co-current or countercurrent flow. The prior art devices seek to separate compounds based on their relative solubilities in two different immiscible liquids, for example, water and an organic solvent.

However, some prior art apparatuses suffer from inefficiencies because the agitation provided to the aggregate mixture is insufficient to provide a high level of uniform distribution of the components within the aggregate mixture and efficient mass transfer of the liquids from their initial to their final compositions. Those apparatuses which can provide sufficient agitation are of complex and costly construction. Such apparatuses are also difficult to maintain as the components are very cumbersome and high-maintenance.

Earlier designs of extraction columns required the columns to be relatively large in order to provide sufficient height for reasonably efficient liquid extraction. Subsequent designs have utilized plates disposed along a shaft attached to propagating means, which has proved to be unreliable and difficult to upkeep.

In some prior art designs, a plurality of perforated plates are spaced along a shaft within an extraction column. The plates are each oriented perpendicularly to the shaft, and the shaft is propagated along its axis so that the plates interact with the aggregate mixture of multiple liquids introduced into the column. Not only are such devices required to be very large with some columns being over a hundred feet tall, the drive mechanism needed to propagate such heavy machinery can be very expensive and are often physically located high in the air and at the top of the column. The drive mechanism and the components themselves are taxed heavily and can suffer from fatigue or can break down after long term use. Frequent maintenance of such devices is commonly required and the high location of the drive mechanisms makes such maintenance difficult and costly.

Other prior art designs include a column having rotating paddle blades that, when rotated with the shaft, force the materials in lateral directions perpendicular to the axis of the shaft. These designs require larger columns of sufficient girth to support additional components. The liquid also flows inefficiently in a serpentine path and is exposed to a relatively smaller cross sectional area of the column due to its inefficient movement and interaction with multiple components required to induce such movement.

The present invention provides an improved apparatus and method for the liquid-liquid extraction process that overcomes deficiencies of the prior art devices . . . .

SUMMARY OF THE INVENTION

The present invention provides an apparatus and method for liquid-liquid extraction using counterflowing liquid phases in a liquid-liquid extraction column, and which performs the extraction process at a much higher efficiency and simpler design than prior art liquid-liquid extraction columns. In one embodiment of the apparatus, a shaft having perforated plates mounted thereon runs along a longitudinal axis inside a cylindrical container. The shaft is connected to a means of rotation and at least one of the plates is mounted at a nonzero angle with respect to a plane normal to the axis of the shaft.

The method of using the apparatus entails introducing the initial mixture of liquids to be separated through one end of the column and allowing it to counterflow against a solvent introduced through an opposite end of the column. The plates are rotated, the angle of such plates thereby agitating the aggregate mixture into a uniform distribution of small droplets and allowing for the solvent to more efficiently extract the desirable component of the compound through mass transfer. This mechanism creates an even distribution of droplets of each component, efficiently disperses them evenly among one another and does so in a smaller relative size and with a simpler drive mechanism. The transfer of components between phases is efficiently achieved while the overall equipment size and complexity for agitating of the aggregate mixture is reduced.

A first aspect of the present invention is an apparatus for extraction of a liquid from a mixture of multiple liquids including a cylindrical container, a shaft extending along an axis and disposed in the container, and a plurality of substantially planar plates. At least one of the plates has a plurality of perforations through which material can flow. Each of the plates is mounted to the shaft and spaced apart along the axis. At least one of the plates is arranged at a non-zero angle with respect to a plane normal to the axis.

In accordance with other embodiments of the first aspect, at least one of the plates arranged at a non-zero angle may have an elliptical perimeter. Each of the plurality of plates may have an elliptical perimeter. Each of the plurality of plates may be arranged at a non-zero angle with respect to a plane normal to the axis. The angles of each plate with respect to the plane normal to the axis may be substantially equal such that the plates are arranged to be substantially parallel to one another. The plurality of plates may be configured into at least first and second groups, with each group being spaced apart along the axis, such that each pair of adjacent plates in the first group is spaced apart from one another along the axis by a first distance, and such that each pair of adjacent plates in the second group is spaced apart from one another along the axis by a second distance different from the first distance. The perforations may be formed in one or more shapes selected from the group consisting of: circle, oval, square, triangle, ellipse, teardrop, and segments or combinations thereof. The apparatus may further include a motor for rotating the shaft and the plates.

The angles of each pair of adjacent plates with respect to the plane normal to the axis may be substantially equal but opposite, such that every other one of the plurality of plates is arranged at a first angle with respect to the plane normal to the axis and substantially parallel to one another, and the remaining plates are each arranged at a second angle with respect to the plane normal to the axis and substantially parallel to one another. The angle of at least one of the plates may differ from another angle of the plurality of plates. Each of the plurality of plates may be arranged at a different non-zero angle with respect to the plane normal to the axis. Each pair of adjacent plates may be spaced apart from one another along the axis by the same distance. Each pair of adjacent plates may be spaced apart from one another along the axis by a different distance.

The apparatus may further include a plurality of spacers disposed about the shaft, such that at least one of the plurality of spacers is disposed between each pair of adjacent plates. At least one of the plurality of spacers may have a cylindrical shape extending along a spacer axis, and at least one of an upper and a lower surface of the spacer may be angled with respect to a plane normal to the spacer axis. Each spacer may have at least one peg disposed on an upper or a lower surface thereof for engagement with an aperture of an adjacently located plate.

At least a portion of a periphery of one plate may be attached to a portion of a periphery of an adjacent plate. The attachment between the peripheries of the plates may be a welded connection. The attachment between the peripheries of the plates may include a pin extending through both peripheries. The attachment between the peripheries of the plates may include a tab of one periphery extending through an aperture in the other periphery.

A second aspect of the present invention is a method for extracting a liquid from a mixture of multiple liquids by using a liquid-liquid extractor. The method includes a step of providing an apparatus including a cylindrical container, a shaft extending along an axis and disposed in the container, and a plurality of substantially planar plates, at least one of the plates having a plurality of perforations through which material can flow, each of the plates being mounted to the shaft and spaced apart along the axis, wherein at least one of the plates is arranged at a non-zero angle with respect to a plane normal to the axis. Another step includes rotating the shaft and plates about the axis such that the plates and the perforations interact with the mixture of multiple liquids, thereby causing the separation of the two liquids based on their relative solubilities.

In accordance with other embodiments of the second aspect, the method may further include feeding the mixture of multiple liquids into the cylindrical container. The step of rotating may include connecting a motor with the shaft to cause the rotation of the shaft.

DETAILED DESCRIPTION

Figure 1:
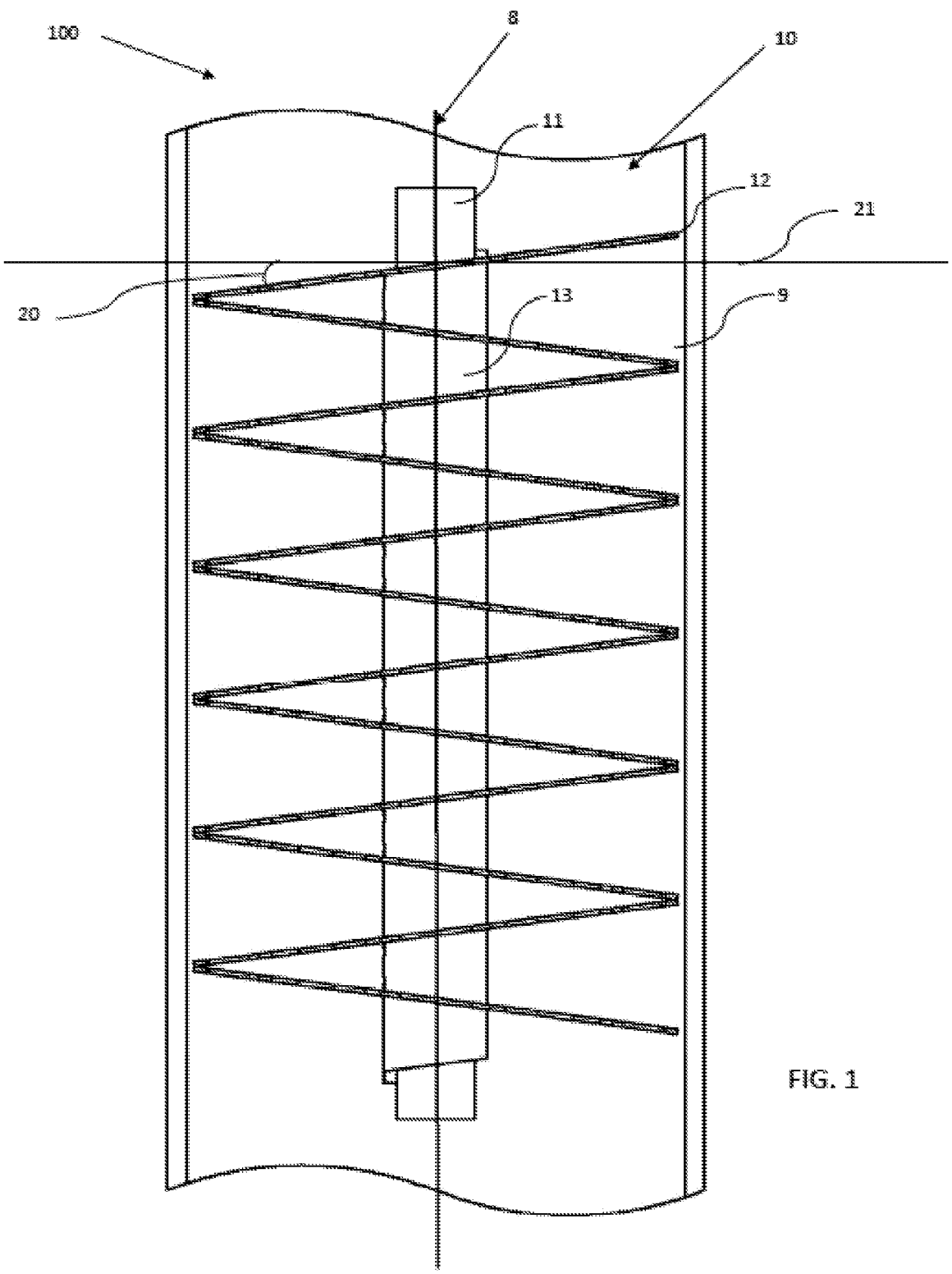
FIG. 1 is a front elevational view of an embodiment of an extraction column in accordance with the present invention.

It should be apparent to those of ordinary skill in the art that the preferred embodiments discussed below are exemplary in nature and may be reconfigured without departing from the scope and spirit of the present invention. However, for clarity and precision, the exemplary embodiments as discussed below may include optional steps, methods, and features that one of ordinary skill should recognize as not being a requisite to fall within the scope of the present invention.

Referring generally to FIGS. 1-4, there is shown one embodiment of a liquid-liquid extraction column 100 of the present invention. Column 100 includes an agitation assembly disposed within a cylindrical container 9. Agitation assembly 10 includes a shaft 11 extending along an axis 8 and a plurality of plates 12 mounted about shaft 11. The cylindrical container 9 has at least one inlet and at least one outlet for introducing and removing a mixture of liquids, a solvent, and any other materials required during the extraction process, and for removing the various components either during the process or as it concludes. Shaft 11 can be connected to a motor or other means of rotation so that the motor can rotate shaft, and accordingly, all of agitation assembly 10. The motor or means of rotation is preferably disposed outside of container 9. In one embodiment, a gear head motor can be utilized and operated at speed of between about 30 and 180 rpm. Other types of motors and other speeds can be used. Container 9 is indicated as being cylindrical, though other container shapes can be utilized so long as the container and agitation assembly are configured for the assembly to rotate within the container.

Figure 2:
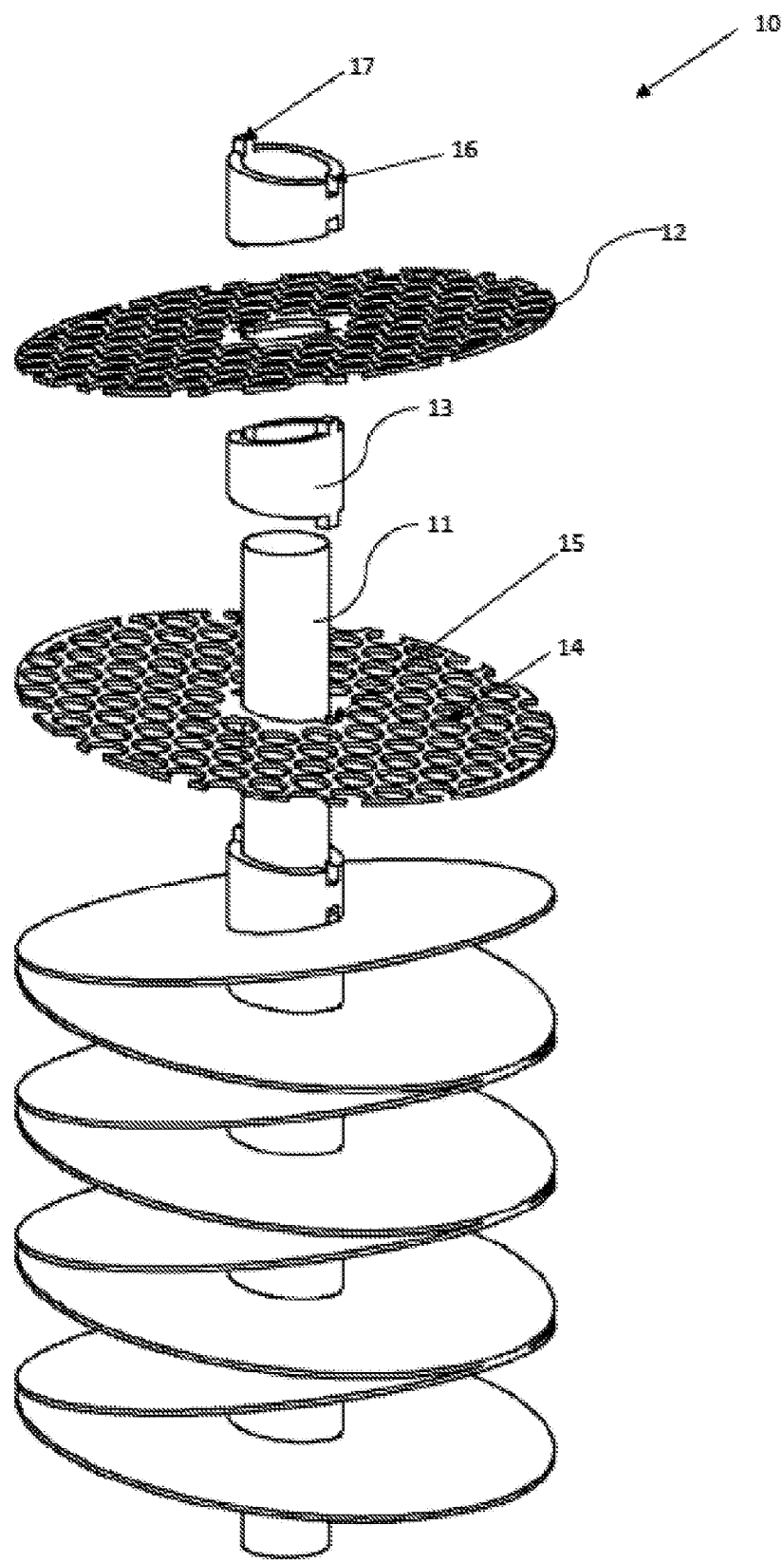
FIG. 2 is a perspective partially exploded view of an agitation assembly of the extraction column shown in FIG. 1.
Figure 3:
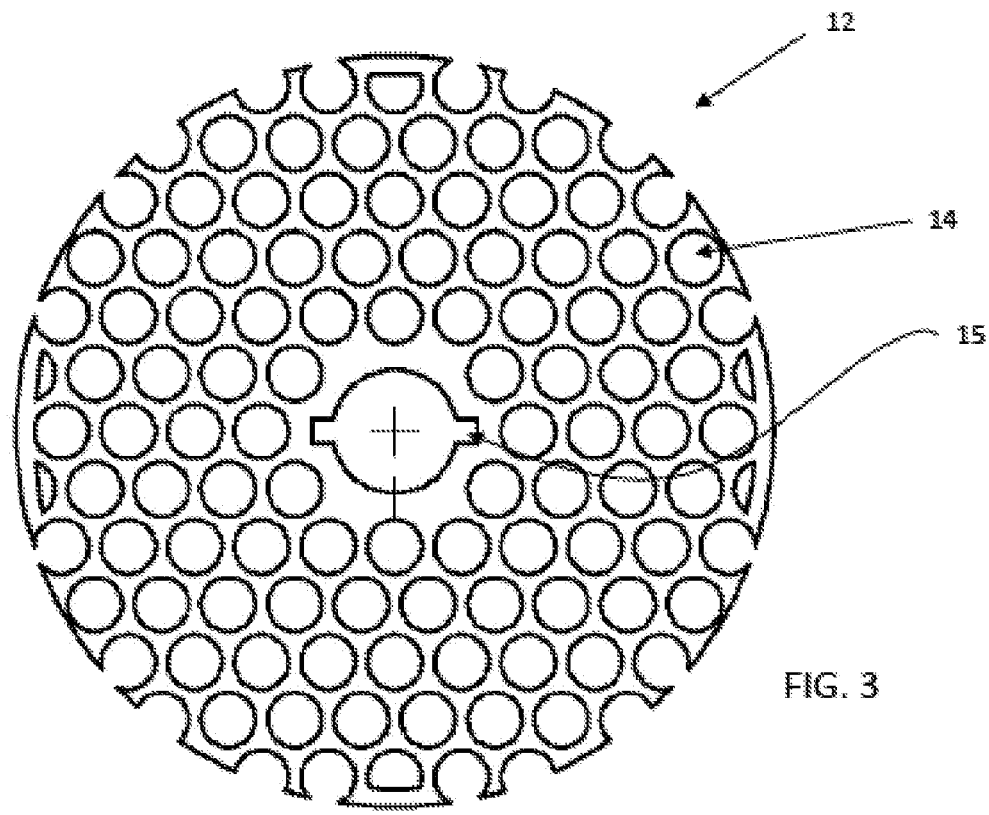
FIG. 3 is a top view of a plate of the extraction column shown in FIG. 1.

As shown in FIGS. 1-3, plates 12 are mounted and spaced apart along shaft 11 in a particular configuration. The particular configuration shown in FIGS. 1 and 2 includes each plate being arranged at an angle with respect to a plane 21 normal to axis 8 of shaft 11. Each plate 12 is substantially planar, although these or other plates use in accordance with the present invention can be configured along simple or complex curvatures. As plates 12 are configured to be planar, an angle 20 between one of plates 12 and plane 21 is shown in FIG. 1. In the embodiment shown in FIG. 1, the angle between each plate and plane 21 is of a magnitude that is non-zero. In other words, each plate 20 is not perpendicular to axis 8 of shaft 11. In one embodiment, angle 20 can be set by determining the distance from plane 21 that the edge or perimeter of plate 12 should be located. For example, the outer edge or perimeter of plate 12 can be disposed about 1 inch below plane 21 in a construction in which container 9 has an inner diameter of about 8 inches. In such a configuration, plate 12 may be about 0.125 inch thick, though other thicknesses can be used. The thickness of plate 12 is selected to provide plate 12 with strength to withstand the many forces that act upon it during the extraction process. From that standpoint, the thickness of plate 12 can be elected based on the material and other dimensions of the plate in an effort to provide strength to the plate without unduly increasing its weight. Of course, many other relative dimensions and sizes can be utilized in the construction of a column according to the present invention.

FIG. 1 depicts a configuration in which the angles of each pair of adjacent plates 12 with respect to plane 21 are substantially equal but opposite. That is, every other plate 12 (i.e. the first, third, fifth, etc. counting from the top of assembly 10) is arranged at angle 20 with respect to plane 21 and is parallel to one another. The remaining plates 12 (i.e. the second, fourth, sixth, etc.) counting from the top of assembly 10) are each arranged at a second angle with respect to plane 21 and parallel to one another. The second angle is substantially equal in magnitude but opposite in direction from angle 20. As a result, plates 12 form a zigzag configuration in the view depicted in FIG. 1.

The configuration of plates 12 depicted in FIG. 1 is only one of a multitude of different configurations made possible by the components of the present invention, as will be described more thoroughly below. In other embodiments, only one plate may be disposed at an angle with respect to plane 21 with the remaining plates being perpendicular to the axis 8. Other embodiments have multiple or all plates disposed at substantially equal or various angles with respect to plane 21.

Figure 4:
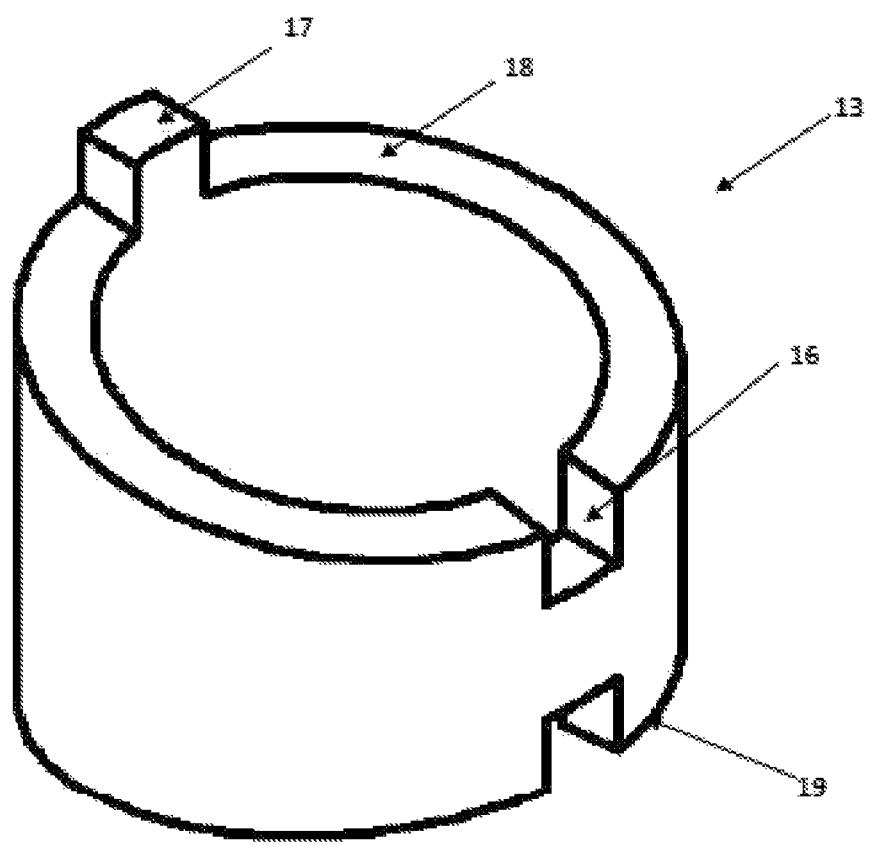
FIG. 4 is a perspective view of a spacer of the extraction column shown in FIG. 1.

Adjacent plates 12 are separated by at least one spacer 13 also disposed about the shaft 11. As shown in FIGS. 1, 2, and 4, each spacer 13 is configured to have a cylindrical shape and includes upper 18 and lower 19 surfaces. These surface 18, 19 can be specifically constructed to be planar and angled with respect to a plane normal to an axis about which spacer 13 is configured (which will be substantially coincident with axis 8 when assembled on shaft 11). In this way, the plates 12 adjacent spacer 13 rest flush against surfaces 18, 19.

Each spacer 13 preferably features a mortise or aperture 16 and tenon or peg 17 on each surface 18 and 19 to allow for connection between adjacent spacers 13. Each mortise is configured to fit within a tenon 17. Notches or apertures 15 are provided at a central portion of each plate 12 to accept tenon 17 of the adjacent spacer 13, as shown in FIG. 3. Preferably, two apertures 15 are provided at diametrically opposed locations of the central aperture of plate 12. In this way, a tenon 17 can extend from an upper or lower surface of a spacer 13, through a notch 15 of an adjacent plate 12, and into a mortise 16 on a spacer 13 on the other side of plate 12. This serves to rotationally lock plate and both adjacent spacers 13 about axis 8 when such components are assembled on shaft 11. It will be appreciated that tenon 17 preferably extends above the surface of spacer 13 on which it is disposed to a length that is greater than the thickness of plate 12 but less than the depth of mortise 16 below the surface of spacer 13 in which it is disposed. Accordingly, tenon 17 can extend past plate 12 and into mortise 16, but is configured to allow two spacers 13 to be positioned directly adjacent to one another (without a plate therebetween) while allowing tenon 17 to be fully seated within mortise 16 without creating a gap between the surfaces of the adjacent spacers 13. It will be appreciated that such mortise and tenon may not be of the squared off shapes depicted in FIG. 4, but instead may be a round peg and a mating round hole, or any other type of mating configuration.

In one embodiment of an agitation assembly of the present invention, a single spacer 13 is disposed between each pair of adjacent plates 12, as shown in FIG. 1. In other embodiments, two or more spacers can be disposed between any pair of plates. As shown in FIG. 1, a spacer 13 is disposed between each pair of plates 12, with each spacer 13 being oriented oppositely from each adjacent spacer 13. This allows spacers 13 to aid in orienting plates 12 at the desired angles with respect to plane 21, and also creates an assembly 10 in which the plurality of spacers 13 and plates 12 are all rotationally locked with respect to one another about axis 8.

At least one of plates 12 features one or more, and preferably a plurality of, perforations 14. In the embodiment shown in FIGS. 2 and 3, each plate 12 of assembly 10 includes perforations 14, though FIG. 2 omits a depiction of the perforations of the bottom eight plates for purposes of clarity. The pattern of perforations 14 can be regular and repeating, or can be irregular in layout. Perforations 14 can, as shown in FIGS. 2 and 3, intersect with the perimeter of the plate 12 so that one or more perforations 14 are incomplete and open at the perimeter. Certain locations of the perimeter may include material that encloses a portion of a perforation 14 to provide added strength of plate 12 at that particular location. Those locations may coincide with portions of a plate 12 that will be in very close proximity or in contact with an adjacent plate. Furthermore, the perforations 14 may be provided in a variety of shapes, patterns, and distributions. Certain shapes include circles, ovals, squares, triangles, ellipses, teardrops, and segments or combinations of these shapes. One or more different shapes can be used in one particular plate 12.

Perforations can be disposed throughout a particular plate so that the total open area of the perforations equals about 25-80 percent of the total area of the plate defined within its perimeter. In other embodiments, the open area of the plate created by the perforations can be about 50-65 percent of the area of the plate surface. Other values are contemplated should more or fewer, or larger or smaller perforations be desired. Perforations can be created through laser cutting, water jet cutting, machining, or punching the desired material from an initially unperforated plate. The plates, with or without perforations, may be molded or cast or pressure or heat formed in whole or in part from materials for which these methods of construction are compatible.

Figure 3A:
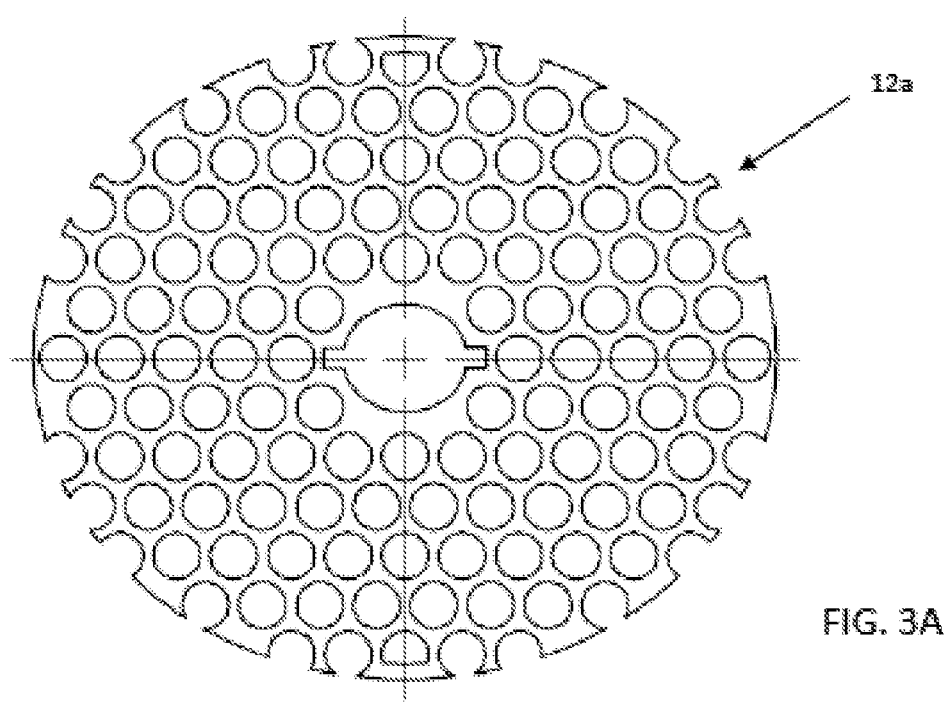
FIG. 3A is a top view of another embodiment of a plate in accordance with the present invention.
Figure 3B:
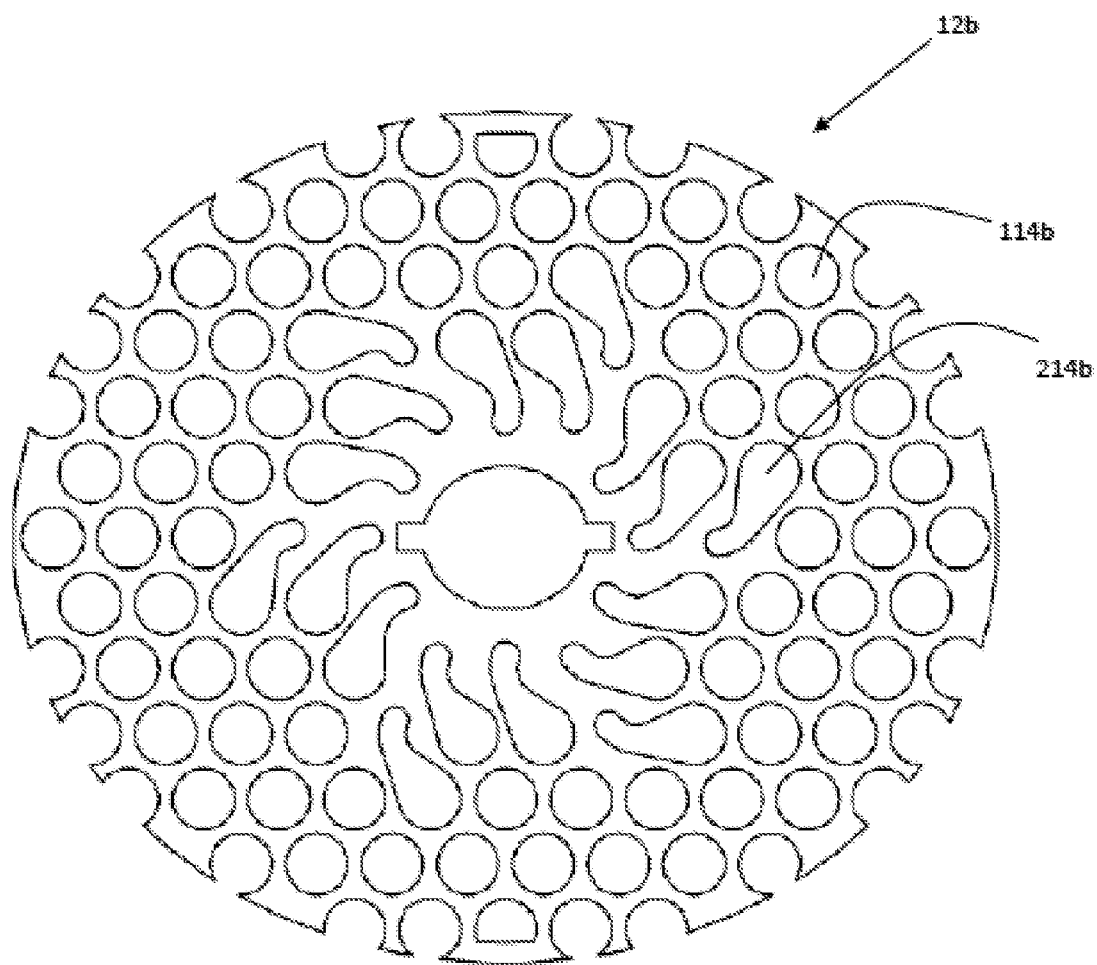
FIG. 3B is a top view of another embodiment of a plate in accordance with the present invention having a unique pattern of perforations therein.

FIG. 3B depicts another embodiment of a plate 12b having an irregular layout of the perforations thereof. In particular, a plurality of circular perforations 114b are disposed in plate 12b, with some of circular perforations 114b intersecting and open to the perimeter of plate 12b. A plurality of uniquely shaped perforations 214b is also disposed in plate 12b. As shown, circular perforations 114b are located more toward the perimeter of plate 12b, and uniquely shaped perforations 214b are located more toward the central portion of plate 12b. This exemplifies that differently configured perforations or combinations thereof can be utilized in any particular pattern as desired for a particular plate.

Plate 12 includes a perimeter that is elliptical and corresponds with the angle at which plate 12 is mounted to the shaft 11. FIG. 3A depicts a plate 12a and shows more clearly the configuration of the elliptical perimeter thereof. The perimeter of plate 12 is also elliptical, though the difference between the major and minor diameters is more subtle. That is, assuming container 9 is cylindrical, plate 12 includes an elliptical perimeter that corresponds with the imaginary elliptical surface resulting from the intersection of the cylindrical internal space of cylinder 9 with a plane not perpendicular to axis 8, or the axis of the cylinder. In this way, despite the fact that plate 12 is angularly mounted with respect to a plane normal to the axis of cylindrical container 9, it is elliptically configured so that it substantially corresponds to an internal cross section of container 9 when projected onto a plane perpendicular to the axis of container 9. Plate 12 can then interact with substantially all of the liquid that passes it along the direction of the axis of cylinder 9. The perimeter of each plate 12 is preferably configured to come within a relatively small distance of the inner walls of the container 9 without contacting the inner wall, which permits plate 12 to substantially fill the cross section of container 9 without contacting it during rotation. In an assembly according to the present invention, one or more of the angled plates in the assembly can include an elliptical perimeter.

Figure 5:
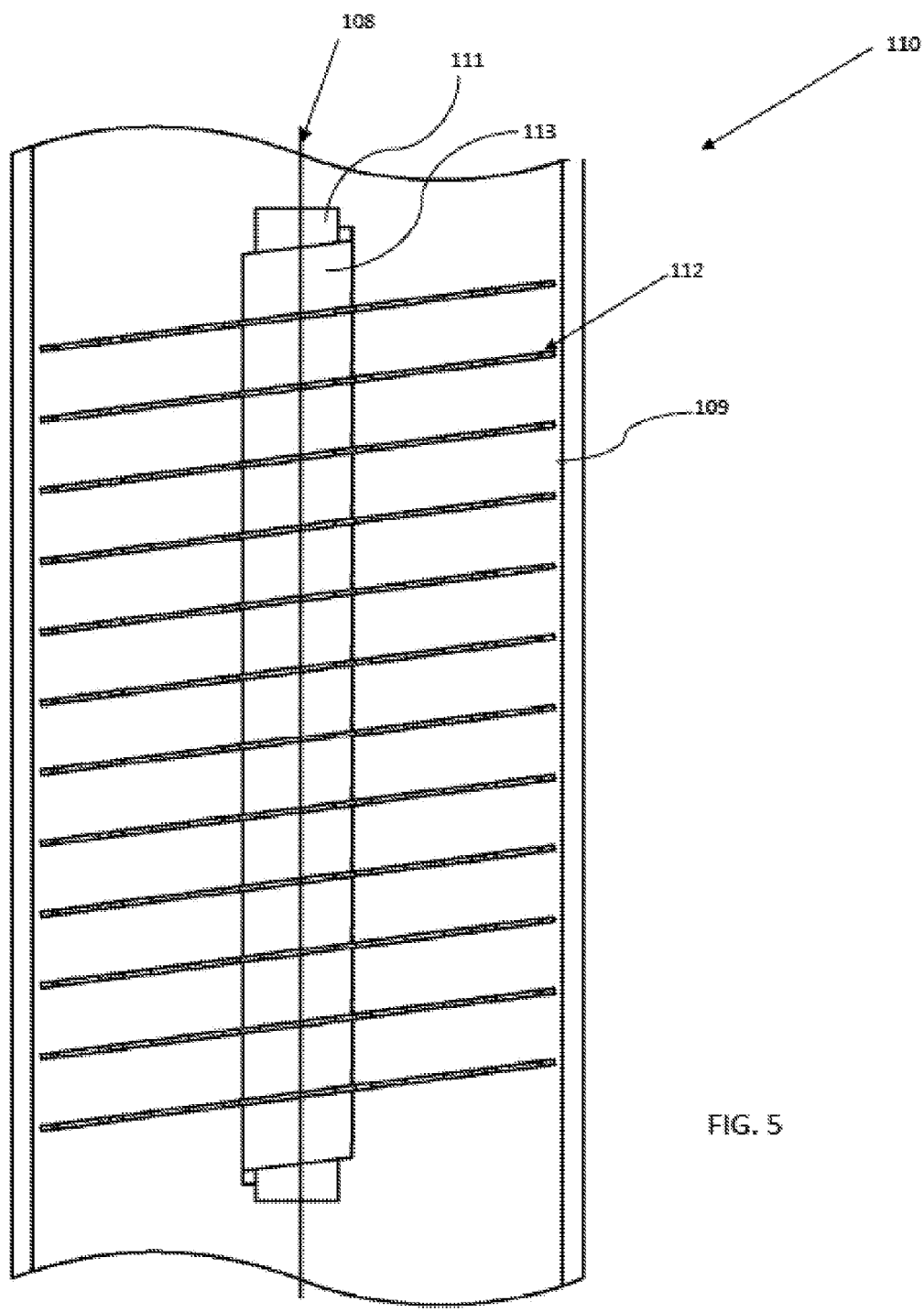
FIG. 5 is a front elevational view of another embodiment of an extraction column in accordance with the present invention.
Figure 6:
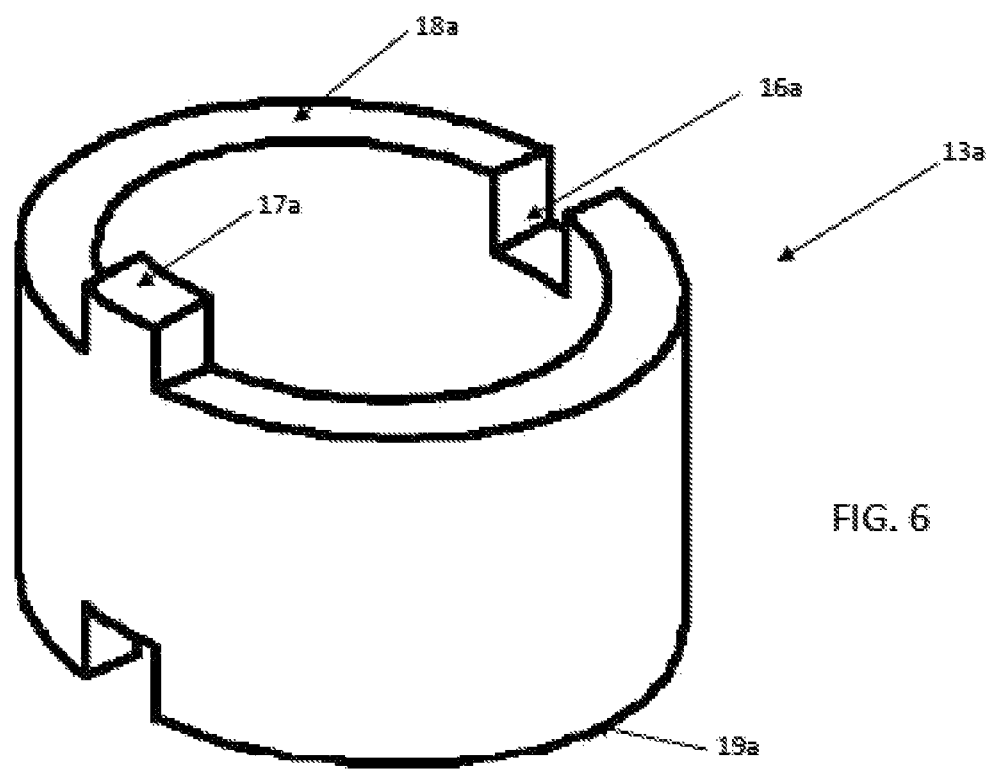
FIG. 6 is a perspective view of a spacer of the extraction column shown in FIG. 5.

The configuration of the various components of the present invention allow for a wide variety of plate arrangements to be utilized. For example, an alternate embodiment of an agitation assembly 110 is shown in FIG. 5. A container 109 and a shaft 111 having an axis 108 are provided as described above. Each plate 112 is mounted at an substantially equal nonzero angle with respect to a plane normal to axis 108 such that plates 112 are arranged parallel to one another. As will be appreciated, plates 112 may be the same as plates 12 described above if the angle at which each is configured with respect to a plane normal to the axis of its respective shaft is the same. In that instance, each plate can simply be oriented in the same direction. Assembly 110 can include a plurality of spacers 113, as shown in greater detail in FIG. 6, which are shaped according to the parallel configuration shown in FIG. 5. Upper and lower surfaces 118, 119 are angled to be parallel to one another in order to provide such parallel spacing with adjacent plates 112.

Figure 7:
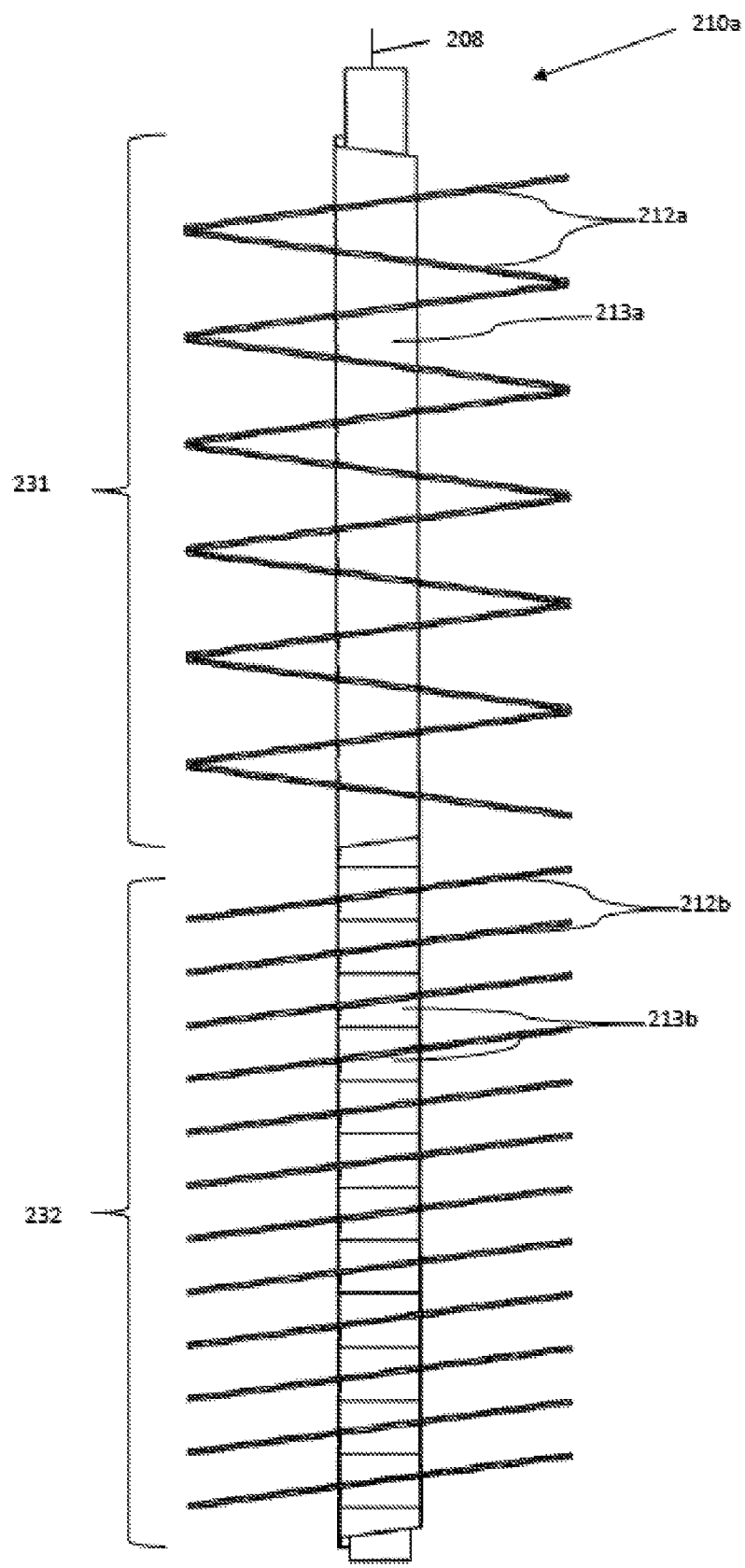
FIG. 7 is a front elevational view of an agitation assembly of another embodiment of an extraction column in accordance with the present invention.
Figure 8:
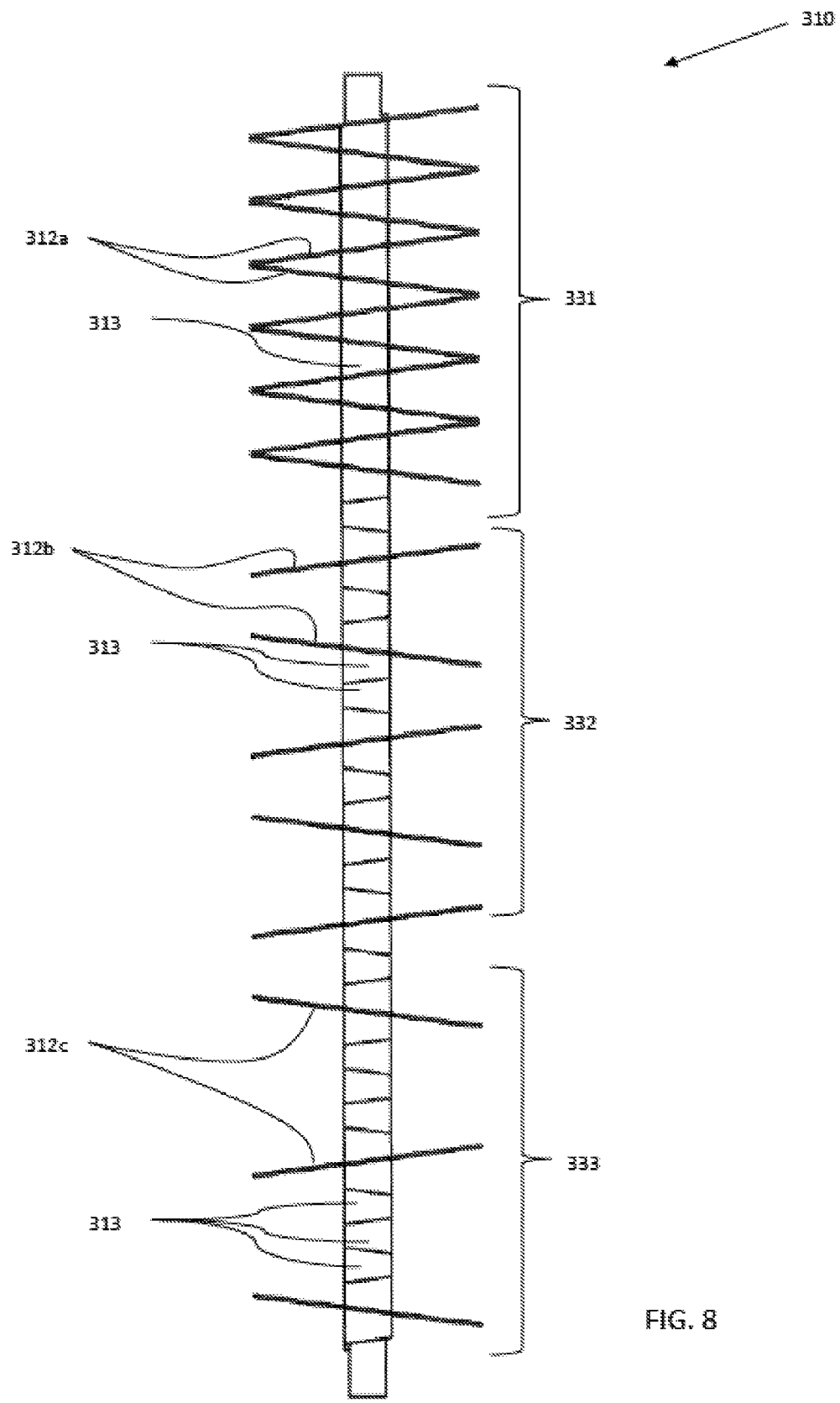
FIG. 8 is a front elevational view of an agitation assembly of another embodiment of an extraction column in accordance with the present invention.

Additional embodiments of an agitation of the present assembly are shown in FIGS. 7 and 8. An assembly 210 is shown in FIG. 7 that has two groups 231, 232 of plates, with each group having a different configuration of the plates therein. In first group 231, plates 212a are configured in a similar way to assembly 10 shown in FIG. 1. That is, the angles of each pair of adjacent plates 212a with respect to a plane normal to axis 208 are substantially equal but opposite. In second group 232 spaced apart along axis 208 from first group 231, plates 212b are configured in a similar way to assembly 110 shown in FIG. 5. That is, each plate 212b is mounted at a substantially equal nonzero angle with respect to a plane normal to axis 208 such that plates 212b are arranged parallel to one another.

The first group 231 of plates 212a is spaced by spacers 213a, which are similar in nature to spacers 13 described above. The second group 232 of plates 212b is spaced by spacers 213b, which are configured to have upper and lower surfaces in which one is angled and one is perpendicular with respect to a plane normal to the axis of spacer 213b. In this way, two spacers 213b can be coupled with the perpendicular faces adjacent each other to form a spacer similar to spacer 113 when the angled surfaces are parallel and to form a spacer similar to spacer 13 when the angled surfaces are opposite but substantially equal.

In another embodiment, an assembly 310 is shown in FIG. 8 having three groups 331, 332, and 333 of plates. First group 331 includes plates 312a configured similarly way to assembly 10 shown in FIG. 1. Second and third groups 332 and 333 each include a plurality of plates similarly angled with those of first group 331, but differently spaced. First group 331 includes one spacer 313 disposed between each pair of plates. Second group 332 includes three spacers 313 dispersed between each pair of plates. And third group 333 includes five spacers 313 disposed between each pair of plates. In this way, a plurality of similar spacers 313 can be provided and used as necessary to provide spacing to assembly 310.

From the foregoing description of various constructs of an agitation assembly, it can be seen that one benefit of the present invention is the relatively small number of components that can be used to construct a potentially endless number of particular assemblies. For instance, assembly 310 of FIG. 8 includes a plurality of identically configured plates and a plurality of identically configured spacers. Those spacers and plates are assembled about the shaft to form the different groups of differently angled and spaced plates. This example shows that the spacing and angles of the plates can be varied as necessary for any particular construction of an agitator assembly. Of course, differently configured plates and differently configured spacers can be used to provide additional variation to the magnitude of the angles of the plates or the spacing between pairs of plates.

Other variations of an agitation assembly in accordance with the present invention can include one or more variables among a pair, a group, or all of the plates. Different pairs or groups of plates can have the same or different variables. For example, the angle can be varied, such that the angle of at least one of the plates can differ from an angle of one of the other plates. This can be such that the angles are substantially equal but opposite, as in assembly 10 of FIG. 1, or such that the magnitude of the angles are different. In one embodiment, a plurality of plates configured at a particular angle can be oriented with respect to the shaft such that each plate is rotated to a different degree about the shaft. In this way, the major axis of each plate would intersect the axis of the shaft but would not be parallel to any other major axis. Of course, this type of relative relationship between the plates could be created between two or any number of plates. In another embodiment of an agitation assembly, any two or more of the plurality of plates can be arranged at a different non-zero angle with respect to a plane normal to the axis of the shaft.

In other embodiments, spacing between the plates can vary. An embodiment of an agitation assembly can include plates in which each pair of adjacent plates is spaced apart from one another along the axis of the shaft by the same distance. In another embodiment, each pair of adjacent plates can be spaced apart from one another along the axis by a different distance. Of course, different spacing can be included between various pairs of plates of an assembly or of a group of plates in an assembly. In one embodiment, each pair of adjacent plates in a first group of plates can be spaced apart from one another along the axis of the shaft by a first distance, and each pair of adjacent plates in a second group of plates can be spaced apart from one another along the axis by a second distance different from the first distance. As described above, spacers can be constructed to dictate spacing, either by using differently configured spacers or by using spacers that, when used adjacent one another, can create different spacing.

In short, the present invention allows for any or all of the angle, rotation, or spacing between two plates to be the same or different. Any or all of these variables can be consistent or varied among the entire agitation assembly. In this way, a particular agitation assembly can be constructed according to need, which can account for a particular use, the particular liquids to be separated, a particularly sized and shaped space in which the column is being designed to fit, or for any other purpose.

In an embodiment in which at least two plates have peripheries that contact with each other, such as in assembly 10 of FIG. 1, at least a portion of a periphery of one plate can be attached to a portion of a periphery of an adjacent plate. This attachment can be a welded connection. Another attachment can include a pin, bolt, or other fastener inserted through each portion of the adjacent plates so that it extend through both peripheries and maintains contact and/or positioning therebetween. In another embodiment, a tab configured on one periphery can be positioned to extend through an aperture configured in the other periphery. Other similar means of connecting the plates can be utilized to maintain a connection between adjacent plates. In one embodiment, the plurality of plates can be constructed as a monolithic series such that, when folded, the plates form the zigzag pattern shown in FIG. 1. In such an embodiment, the attachment would be created through the monolithic construction of the plurality of plates.

The components of the agitation assembly can be comprised of any rigid material constructed to withstand the forces that will be exerted thereon through rotation of the agitation assembly and interaction with various liquids. Preferably, the components are manufactured from titanium, stainless steel, or any other rigid metal. Other suitable materials can include, without limitation, ceramics, plastics, or any combination or alloys of ceramics, plastics, and metals.

A liquid-liquid extraction column according to any one of the above described embodiments can be used for extracting a liquid from a mixture of multiple liquids. The column is provided to include a cylindrical container and an agitation assembly including at least one plate arranged at an angle with respect to a plane normal to axis of the shaft. The mixture of multiple liquids can be fed into the container along with any necessary solvents. The agitation assembly is rotated within the mixture of multiple liquids to induce a high degree of interaction between the liquids.

In a counter-current flow model of the extraction process, the initial mixture of the liquids to be separated can be introduced at or near the bottom of container 9, and the solvent can be introduced at or near the top of container 9. Of course these locations can be switched. The usual goal of this counter-current flow model is to allow the solvent to flow in one direction of the container while the initial mixture flows in the opposite direction of the container. Flow can be dictated by the weights of the materials introduced into container, with the heavier of the materials being added at the top so that its weight aids in directing its flow to the bottom.

It is also conceivable that a co-current flow model of the extraction process can be utilized with the columns of the present invention. In such a co-current flow model, both the solvent and the initial mixture can enter into the container at the same end and together exit the opposite end. The solvent and the initial mixture both flow through the container in a co-current manner and exit the container together from the opposite end, with the final separation of the two liquid phases being accomplished in a separate vessel outside of the container. Therefore, the liquid-liquid extractor of the present invention can be utilized or even specifically configured for extraction using counter-current and co-current flow models.

The following method describes a counter-current flow model, although a co-current flow model will be understood from this description as well. Either during or after the introduction of the liquids into the container, the shaft is rotated, thereby rotating the agitation assembly, including the plates, about the axis of the shaft. While the liquids generally flow past one another, the plates themselves and particularly the perforations in the plates slice through the liquids to create substantially uniform droplets of each liquid that are dispersed as evenly as possible throughout the open volume of the container. In this way, a greater interfacial area between the liquid mixture and the solvent is achieved, which permits a very high level of interaction and transfer of the individual components of the liquids. The construction of the agitation assembly of the present invention produces, as desired, a very consistent and uniform droplet size and dispersion throughout the aggregate liquid mixture within the container. This process facilitates liquid-liquid extraction by exposing a greater surface area of the initial liquid mixture to the solvent.

Figure 9:
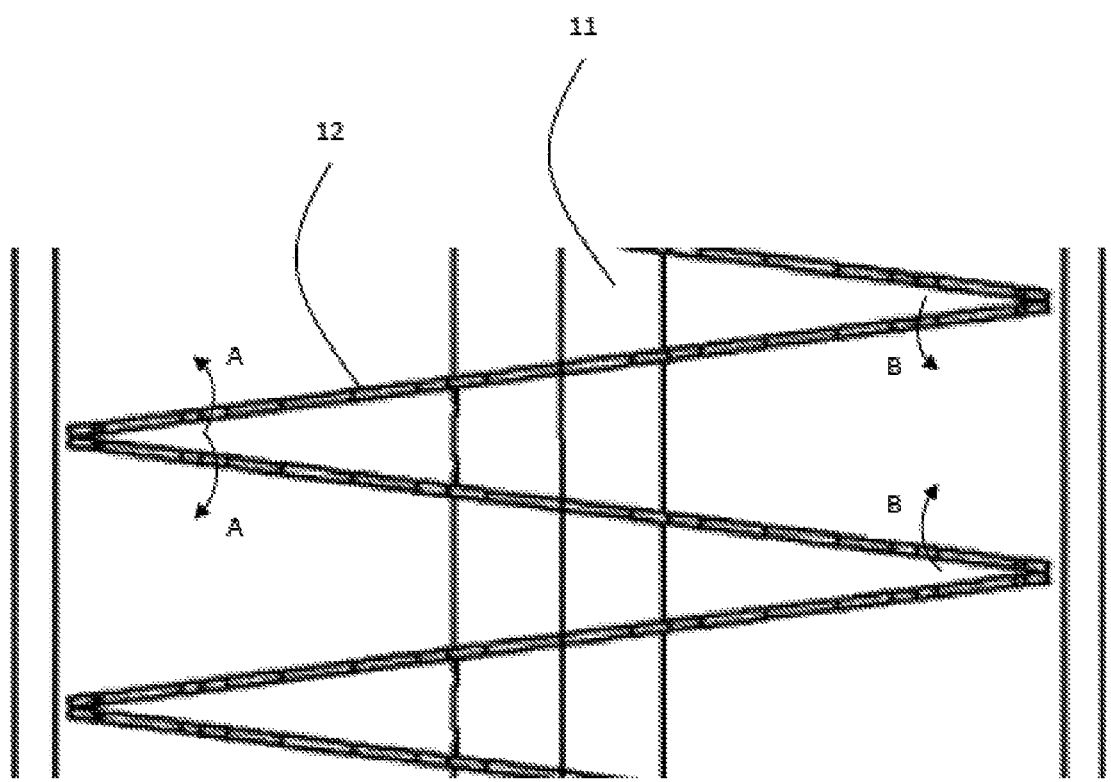
FIG. 9 is an enlarged front elevational view of a portion of the extraction column shown in FIG. 1.

Interaction between the distributed droplets is also facilitated through the motion induced by the angled plates. For example, FIG. 9 is an enlarged view of a portion of agitation assembly 10 shown in FIG. 1. As assembly 10 is rotated, the space between each pair of plates is similar in nature to a rotating wedge. As that wedge rotates, the droplets dispersed in the thicker portion of the wedge are compressed as the portions of the plates that are in contact with one another rotate toward the droplets. The effect is that the mixture of droplets is forced to pass through the perforations in the plates in the directions shown by arrows A. The alternative to this induced motion is that as the thicker portion of the wedge receives a mixture of droplets from upper and lower adjacent spaces, as shown by arrows B. While the natural weights and solubilities of the liquids create a general flow along the container, the rotation of the agitation assembly operates both to slice the liquids into more uniform droplets through interaction of the materials with the plates and also to induce interaction of the droplets to create a greater dispersion and higher interaction to facilitate the necessary extraction. While this interaction is shown with respect to the embodiment shown in FIG. 1, it will be understood that any particular orientation of an angled plate with respect to another plate will create at least some degree of these compression forces on the liquids to slice and disperse the liquids. As the agitation assembly can be constructed to virtually any configuration, the effects of these forces can be tailored to specific liquids by altering the angle, spacing, rotation, etc. of the plates in any particular assembly.

Ultimately, the initial liquid mixture is broken into two or more components as one or more of the components breaks away from the others to adhere to the solvent. The solvent/component mixture eventually separates from the remaining one or more components of the initial liquid mixture as each of these mixtures make their way to opposing ends of the container. Once the agitation assembly has been run long enough to facilitate enough extraction, the resulting mixtures can be removed from the column through the inlet/outlet ports.

Some industrial processes have solid, particulate matter in the inlet mixture. Extraction equipment in the prior art employs plates normal to the cylinder axis, whether fixed plates or propagating axially. These plates inherently offer "shelves" onto which these solid particulates can settle and collect. In extraction columns according to the present invention, the inclined plates offer fewer locations for solids to settle and collect. The combination of inclined plates, rotation, localized compression and decompression, and jetting of the liquids through the apertures in the plates inherent in the present invention continually sweep such solids from collecting inside the device. Therefore, the present extraction column is less prone to fouling and more tolerant of particulate solids which may be in the initial mixture.

The construct of the present invention to include a rotating agitation assembly with at least one angled plate improves over propagating designs of the prior art by providing a rotatable assembly, which is both easier and more cost-efficient to operate than propagating designs. The components of the present invention consequently last much longer than those of prior art designs. The angled configuration of the plates also induces motion of the liquids in directions more generally aligned with the axis of the container. This overcomes the inefficiencies of certain prior art designs with rotating paddle blades, which create lateral movement of the liquids that both slows and makes the extraction process less efficient.

References herein to angles between a plate and a plane normal to an axis of the shaft of the agitation assembly are meant to describe the non-perpendicular relationship between the plate and the axis of the shaft. References to angles between a plate and the axis itself also describe this angled relationship. Of course, if non-planar plates are utilized in an agitation assembly, the general angle of such a plate is also intended to be angled with respect to the axis or a plane normal thereto. Additionally, references to plates being parallel or angles being equal, opposite, or parallel is not meant to encompass angles or values that are substantially equal, substantially opposite, or substantially parallel as well. Indication that something is equal, opposite, parallel, etc. does not necessarily require a precise value but includes variations from such value that would be understood by one having ordinary skill in the art in light of the disclosure of the present application.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An apparatus for extraction of a liquid from a mixture of multiple liquids, comprising:
   a cylindrical container;
   a shaft extending along an axis and disposed in said container;
   a plurality of substantially planar plates, at least one of the plates of the plurality having a plurality of perforations through which material can flow, the plates of the plurality being mounted to said shaft and spaced apart along the axis, wherein the plates of the plurality include a first plate arranged at a first non-zero angle with respect to a plane normal to the axis and a second plate arranged at a second angle with respect to the plane normal to the axis, the first angle being different than the second angle, wherein the first and second plates are adjacent to one another along the shaft; and
   a motor configured to rotate said shaft and said plurality of plates about the axis,
   whereby, through such rotation, the first and second plates induce compression and decompression forces on opposite sides of the shaft, respectively, on the mixture of multiple liquids between the first and second plates to cause greater interaction among droplets of the multiple liquids.

2. The apparatus of claim 1, wherein at least one of the plates of the plurality that is arranged at a non-zero angle has an elliptical perimeter.

3. The apparatus of claim 1, wherein at least one of the plates of the plurality is arranged at a non-zero angle with respect to the plane normal to the axis.

4. The apparatus of claim 3, wherein at least one of the plates of the plurality has an elliptical perimeter.

5. The apparatus of claim 3, wherein alternating plates of the plurality are arranged at substantially equal but opposite angles with respect to the plane normal to the axis such that every other plate of the plurality is substantially parallel to one another.

6. The apparatus of claim 3, wherein at least one of the plates of the plurality is arranged at a different non-zero angle with respect to the plane normal to the axis.

7. The apparatus of claim 1, wherein each plate of the plurality is spaced apart from an adjacent plate of the plurality along the axis by the same distance.

8. The apparatus of claim 1, wherein each plate of the plurality is spaced apart from an adjacent plate of the plurality along the axis by a different distance.

9. The apparatus of claim 1, wherein
   the plurality of plates is configured into at least first and second groups, each group being spaced apart along the axis,
   each plate in the first group is spaced apart from an adjacent plate in the first group along the axis by a first distance, and
   each plate in the second group is spaced apart from an adjacent plate in the second group along the axis by a second distance different from the first distance.

10. The apparatus of claim 1, further comprising at least one spacer disposed about the shaft between adjacent plates of the plurality.

11. The apparatus of claim 10, wherein at least one of the spacers has a cylindrical shape extending along a spacer axis, and at least one of an upper and a lower surface of the spacer is angled with respect to a plane normal to the spacer axis.

12. The apparatus of claim 10, wherein each spacer has at least one peg disposed on an upper or a lower surface thereof for engagement with an aperture of an adjacently located plate.

13. The apparatus of claim 1, wherein at least a portion of a periphery of one plate of the plurality is attached to a portion of a periphery of an adjacent plate of the plurality at an attachment.

14. The apparatus of claim 13, wherein the attachment is a welded connection.

15. The apparatus of claim 13, wherein the attachment includes a pin extending through both peripheries.

16. The apparatus of claim 13, wherein the attachment includes a tab of one periphery extending through an aperture in the other periphery.

17. The apparatus of claim 1, wherein
   the perforations are formed in one or more shapes selected from the group consisting of: circle, oval, square, triangle, ellipse, teardrop, and segments and combinations thereof.

18. A method for extracting a liquid from a mixture of multiple liquids, comprising:
   using an apparatus including a cylindrical container, a shaft extending along an axis and disposed in said container, and a plurality of substantially planar plates, at least one of the plates of the plurality having a plurality of perforations through which material can flow, the plates of the plurality being mounted to said shaft and spaced apart along the axis, wherein the plates of the plurality include a first plate arranged at a first non-zero angle with respect to a plane normal to the axis and a second plate arranged at a second angle with respect to the plane normal to the axis, the first angle being different than the second angle, wherein the first and second plates are adjacent to one another along the shaft, wherein the using includes rotating the shaft and plates about the axis such that the first and second plates induce compression and decompression forces on opposite sides of the shaft, respectively, on the mixture of multiple liquids between the first and second plates to cause greater interaction among droplets of the multiple liquids.

19. The method of claim 18, further comprising feeding the mixture of multiple liquids into the cylindrical container.

20. The method of claim 18, wherein the step of rotating includes operating a motor connected with the shaft to cause the rotation of the shaft.

21. The apparatus of claim 1, wherein a first two adjacent plates of the plurality are spaced apart from each other along the axis by a first distance, and a second two adjacent plates of the plurality are spaced apart from each other along the axis by a second distance that is different from the first distance.

22. The apparatus of claim 1, wherein at least one of the first and second plates has a plurality of perforations.

* * * * *